United States Patent
Chen et al.

(10) Patent No.: US 9,671,762 B2
(45) Date of Patent: Jun. 6, 2017

(54) SOLAR SMART WATCH

(71) Applicant: EVERDISPLAY OPTRONICS (SHANGHAI) LIMITED, Shanghai (CN)

(72) Inventors: Jr-Hong Chen, Shanghai (CN); Chien-Er Huang, Shanghai (CN)

(73) Assignee: EverDisplay Optronics (Shanghai) Limited, Shanghai (CN)

(*) Notice: Subject to any disclaimer, the term of this patent is extended or adjusted under 35 U.S.C. 154(b) by 0 days.

(21) Appl. No.: 15/071,438

(22) Filed: Mar. 16, 2016

(65) Prior Publication Data
US 2017/0068225 A1    Mar. 9, 2017

(30) Foreign Application Priority Data
Sep. 8, 2015   (CN) .......................... 2015 1 0567543

(51) Int. Cl.
*G04G 19/00* (2006.01)
*G04G 9/04* (2006.01)
*G04G 21/08* (2010.01)
*G04B 37/14* (2006.01)
*H02S 40/38* (2014.01)

(52) U.S. Cl.
CPC .......... *G04G 19/00* (2013.01); *G04B 37/1486* (2013.01); *G04G 9/04* (2013.01); *G04G 21/08* (2013.01); *H02S 40/38* (2014.12)

(58) Field of Classification Search
CPC .......... G04G 9/04; G04G 19/00; G04G 21/08; G04B 37/1486; H02S 40/38
See application file for complete search history.

(56) References Cited

U.S. PATENT DOCUMENTS

| | | | | |
|---|---|---|---|---|
| 7,843,411 B2* | 11/2010 | Manning | ............... | G06F 3/147 345/87 |
| 8,482,909 B2* | 7/2013 | Douglas | ............... | A44C 5/0015 361/679.03 |
| 2003/0016590 A1* | 1/2003 | Brewer | ............... | G02B 26/026 368/82 |
| 2006/0146654 A1* | 7/2006 | Yeager | ............... | A44C 5/12 368/281 |
| 2008/0004510 A1* | 1/2008 | Tanzawa | ............... | A44C 5/0015 600/301 |
| 2009/0207701 A1* | 8/2009 | Jacques | ............... | G04G 17/083 368/205 |
| 2014/0378853 A1* | 12/2014 | McKinney | ............... | A61B 5/02438 600/509 |
| 2015/0009784 A1* | 1/2015 | Cho | ............... | G04G 21/08 368/224 |

(Continued)

*Primary Examiner* — Sean Kayes
(74) *Attorney, Agent, or Firm* — Yunling Ren

(57) ABSTRACT

A solar smart watch is provided. The solar smart watch includes: a case; a first display component, provided on a surface of the case, the first display component comprising at least a first touch sensing device and a first display device; two bands, respectively connected to opposite ends of the case, each of the two bands including a second display component, the second display component including at least a flexible second display device and a flexible second solar device, and the second solar device being laminated on an upper surface of the second display device; and a control module, connected to the first display device and the second display device.

20 Claims, 11 Drawing Sheets

(56) References Cited

U.S. PATENT DOCUMENTS

| | | | |
|---|---|---|---|
| 2015/0098309 A1* | 4/2015 | Adams | G04G 9/0064 368/10 |
| 2015/0192903 A1* | 7/2015 | Vondle | G04G 17/08 368/317 |
| 2015/0378391 A1* | 12/2015 | Huitema | G06F 1/163 361/679.03 |

* cited by examiner

SOLAR SMART WATCH

This application is based upon and claims priority to Chinese Patent Application No. 201510567543.6, filed on Sep. 8, 2015, the entire contents of which are incorporated herein by reference.

TECHNICAL FIELD

The present disclosure relates to a smart watch, particularly, to a solar smart watch.

BACKGROUND

A smart watch is a wrist watch employed with an embedded system for enhanced functions based on time reporting, and has functions similar to a personal digital assistant (PDA). An early stage smart watch is able to perform basic functions of calculating, translating or consoling handheld electronic games, and a mid-term smart watch has realized a function of a wearable computer. Most smart watches are able to execute mobile software applications, some of them may run a mobile operation system (OS), and a few of them have a full mobile phone function. Other functions mainly relate to portable multimedia play, such as playing FM radio and message or movie files and listening through Bluetooth earphones.

Apple Inc. released Apple Watch in the fourth quarter of 2014, while its most major flaw is the serious shortage of power supply that requires an instantly charging within a continuous use of less than 24 hours. A wearable smart product itself is limited to its finite volume, and the battery accommodating space is reduced and limited while pursuing a large display area. Accordingly, it is a major research direction in the future to solve the power supply problem of a wearable smart product.

Some current available smart watch absorbs sunlight and generates electric power by adding a solar cell plate on the watch dial. However, during a daily use, the watch will turn to various directions with the wrist, and thus it cannot ensure that watch dial always faces the light source. Accordingly, the obtained electric power is limited, which makes little help to the battery life.

SUMMARY

According to one aspect of the present disclosure, a smart watch is provided, including: a case; a first display component, provided on a surface of the case, the first display component comprising at least a first touch sensing device and a first display device; two bands, respectively connected to opposite ends of the case, each of the two bands including a second display component, the second display component including at least a second display device that is flexible and a second solar device that is flexible, and the second solar device that is flexible being laminated on an upper surface of the second display device; and a control module, connected to the first display device and the second display device.

Preferably, each of the two bands is independently formed of the second display component, a first end of the second display component is connected to the case, and a second end of the second display component is connected to a buckle.

Preferably, each of the two bands further includes a band body, the second display component is provided on an upper surface of the band body, a first end of the band body is connected to the case, and a second end of the band body is connected to a buckle.

Preferably, the first display component further includes a first solar device, and the first solar device is selectively provided on an upper surface of the first touch sensing device or between the first touch sensing device and the first display device.

Preferably, the second display device further includes a second touch sensing device.

Preferably, the first display component has a light transmittance equal to or greater than 90%.

Preferably, the second display component has a light transmittance of 40% to 80%.

Preferably, each of the second display components has a length equal to that of each of the bands.

Preferably, the second display component has a width equal to or greater than 80% of the width of the band.

Preferably, the second display component has an area equal to or greater than that of the first display component.

Preferably, the second display component has an area equal to or greater than 60% of the total display area.

Preferably, the first display device is a liquid crystal device or an organic light emitting diode display device.

Preferably, the second display device is an organic light emitting diode display device.

Preferably, the second solar device has a light transmittance of 40% to 80%.

Preferably, the solar smart watch further includes a battery, provided in the case, the battery being respectively connected to the second solar device of each of the bands.

Preferably, the solar smart watch further includes a battery, provided in the case, the battery being respectively connected to the first solar device and the second solar device of each of the bands.

BRIEF DESCRIPTION OF THE DRAWINGS

Other features, purposes and advantages of the present disclosure will become more apparent by reading the detailed description of the non-limiting embodiments with reference to the following drawings, wherein.

DETAILED DESCRIPTION

Figure 1:
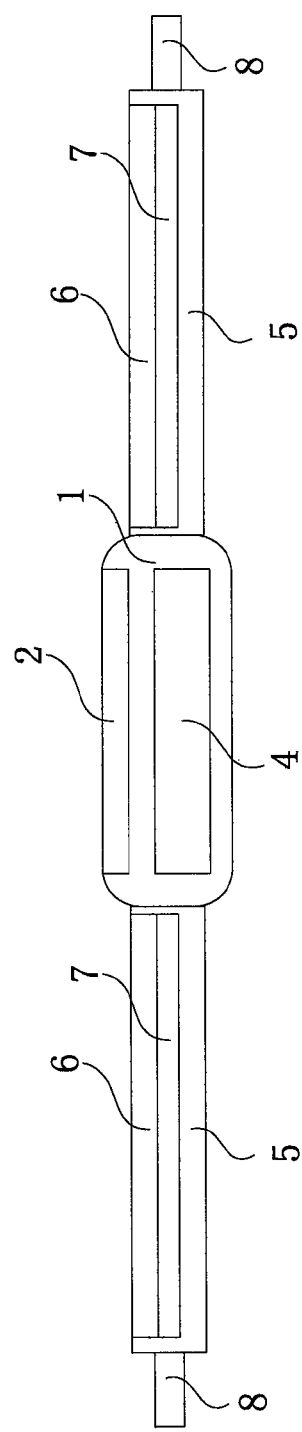
FIG. 1 is a sectional view of a solar smart watch of a first embodiment of the present disclosure.

The example embodiments will now be described more fully with reference to the accompanying drawings. However, the example embodiments cam be implemented in various forms, and should not be interpreted as being limited to the embodiments set forth herein; on the contrary, these embodiments are provided such that the present disclosure will be thorough and complete, and will fully convey the concept of the example embodiments to those skilled in the art. In the drawings, the same reference numerals denote the same or like structures, and thus their repeated description will be omitted.

The described features, structures or characters may be combined in one or more embodiments in any suitable manner. In the following description, numerous specific details are provided so as to allow a full understanding of the embodiments of the present disclosure. However, those skilled in the art will recognize that the technical solutions of the present disclosure may be implemented without one or more of the specific details, or other methods, components, materials and so on may be used. In other cases, the well-known structures, materials or operations are not shown or described in detail to avoid obscuring various aspects of the present disclosure.

The First Embodiment

As illustrated in FIGS. 1-4, the first embodiment of the present disclosure provides a solar smart watch, including: a case 1, a first display component, a battery 4, two bands 5, two second display components and a control module. The first display component is provided at the surface of the case 1, and the first display component includes a first touch sensing device (not illustrated) and a first display device 2. The first touch sensing device may be a thin film type capacitor array. The two bands 5 are respectively connected to the opposite ends of the case 1. Each band 5 includes a band body, and the second display components are respectively provided at an upper surface of the band body. A first end of the band body is connected to the case 1, and a second end of the band body is connected to a buckle 8. The band body may be but not limited to a metal band, a leather band, a plastic (or rubber) band, or the like. The second display component includes a second display device 7 that is flexible and a second solar device 6 that is flexible. The second solar device 6 is laminated on an upper surface of the second display device 7, so as to improve sunlight absorption, but it is not limited thereby. The control module is respectively connected to the first display device and the second display device, so as to collectively control the contents displayed on the two display devices. The battery 4 is provided in the case 1. The battery 4 is respectively connected to the second solar device 6 in each band, and receives and stores electric power from the second solar device 6.

Figure 2:
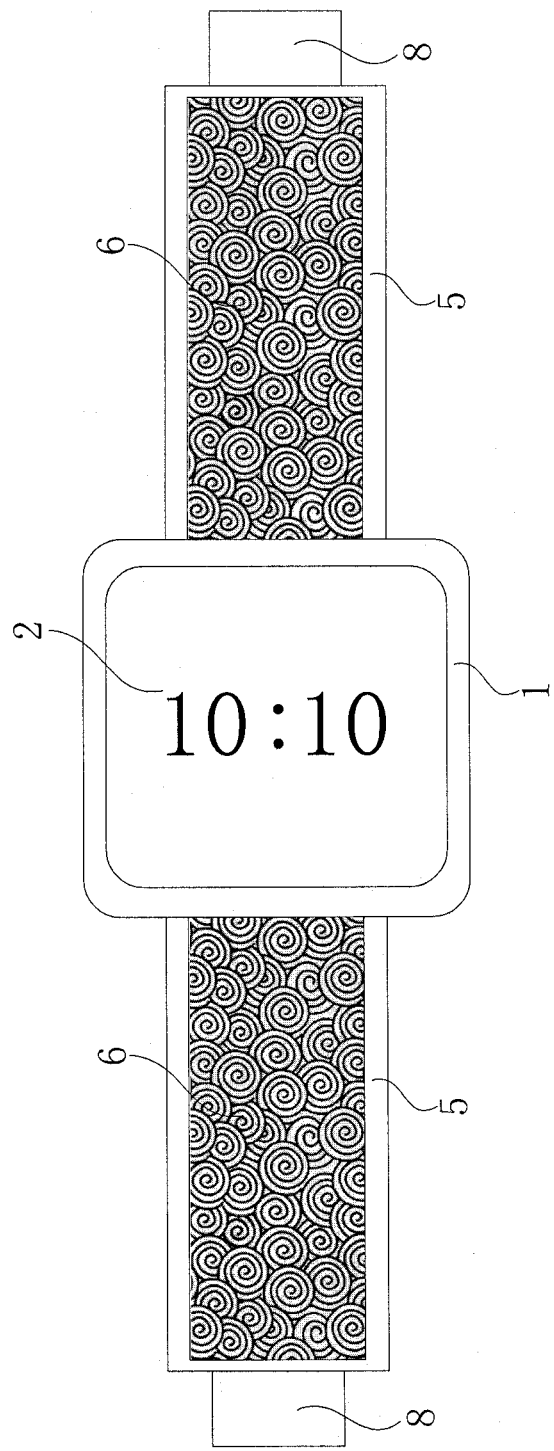
FIG. 2 is a plan view of a first display state of the solar smart watch of the first embodiment of the present disclosure.
Figure 3:
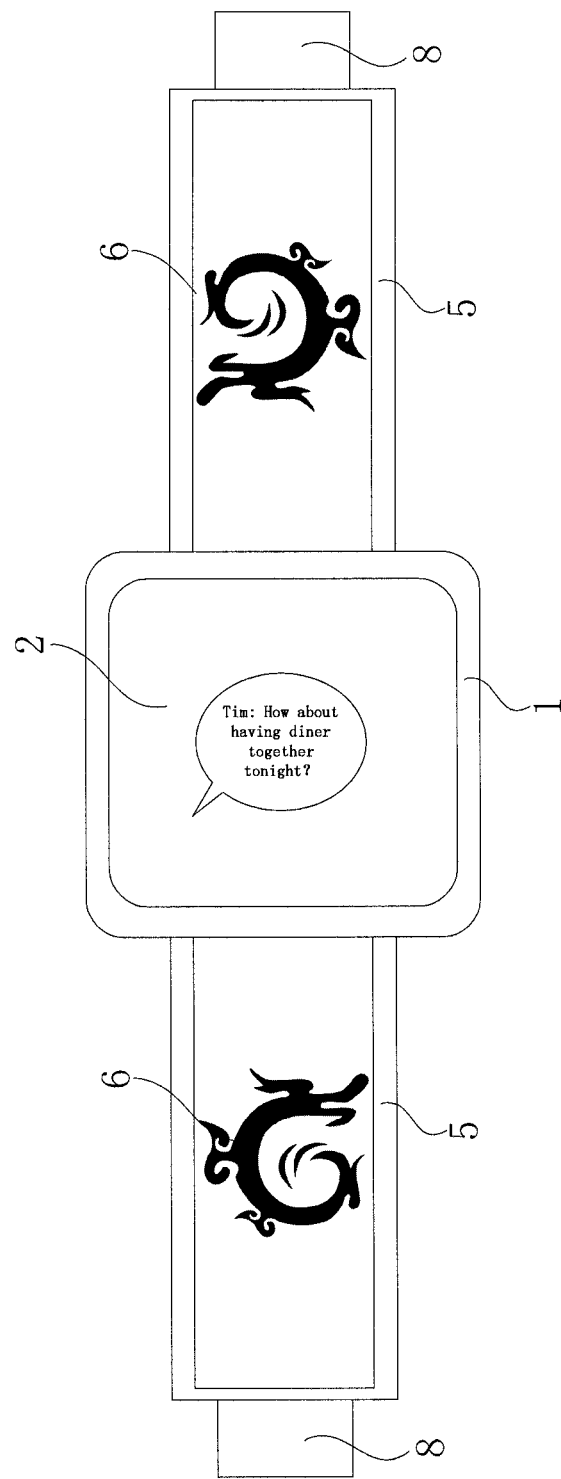
FIG. 3 is a plan view of a second display state of the solar smart watch of the first embodiment of the present disclosure.

The first display component and the second display component have different screen structures. The first display component is a primary display screen for displaying major information (as illustrated in FIGS. 2 and 3, displaying time or short message). The second display component is a secondary display screen mainly for displaying decorative colors and patterns (as illustrated in FIGS. 2 and 3, displaying different decorative patterns and changing into different bands) or other secondary information. The first display component requires a relatively high transparency of a transmittance equal to or greater than 90%, but it is not limited thereto. The type of the display screen used in the first display component is a liquid display device (a hard screen) or an organic light emitting diode display device (a hard screen or a flexible screen).

Preferably, the second display device 7 may respectively include a second touch sensing device (not illustrated), and the second touch sensing device may be a thin film type capacitor array for performing touch control on the content displayed in the second display device 7. The second display device 7 is an organic light emitting diode display device (a flexible screen) freely bendable along with the band. The second display component has a transmittance of 40% to 80%, but it is not limited thereto. The second display component is required to occupy a relative large display area to have enough area usable for solar modules, and the second display component has an area equal to or greater than that of the first display component. Ideally, the second display component occupies an area equal to or greater than 60% of the total display area, but it is not limited thereto. Each second display component has a length equal to that of each band, but it is not limited thereto. A width of the second display device is equal to or greater than 80% of a width of the band, but it is not limited thereto.

Figure 4:
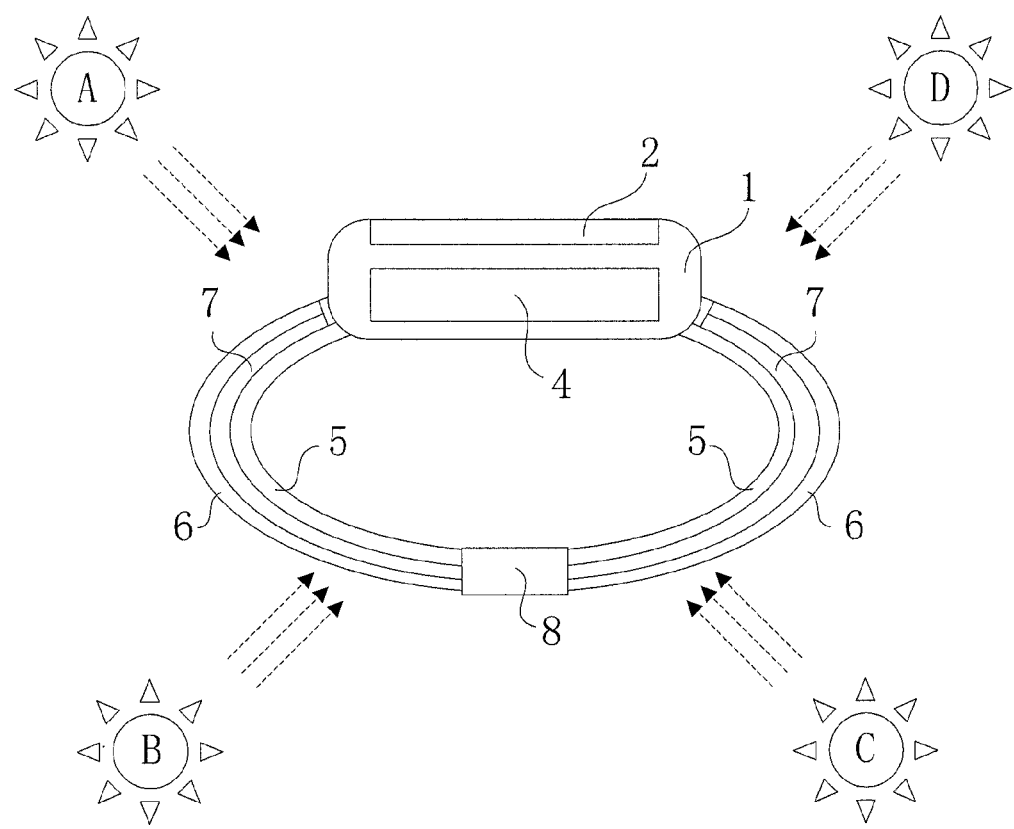
FIG. 4 is a schematic diagram of a wearing state of the solar smart watch of the first embodiment of the present disclosure.

As illustrated in FIG. 4, after the bands 5 of the solar smart watch are buckled up using the buckle 8, the solar smart watch forms a ring shape, while both the second display device 7 and the second solar device 6 on the bands 5 are able to bend into a ring structure along with the bands. The second solar device 6 may absorb light from various directions (e.g., the sun at different orientations A, B, C and D of the watch), and thus ensure some part of the second solar device 6 always faces the strong light source, so as to obtain and generate more electric power. In addition, the second display device 7 having a large area may provide more information, create virtual buttons for the operation of the solar smart watch, or the like.

The Second Embodiment

Figure 5:
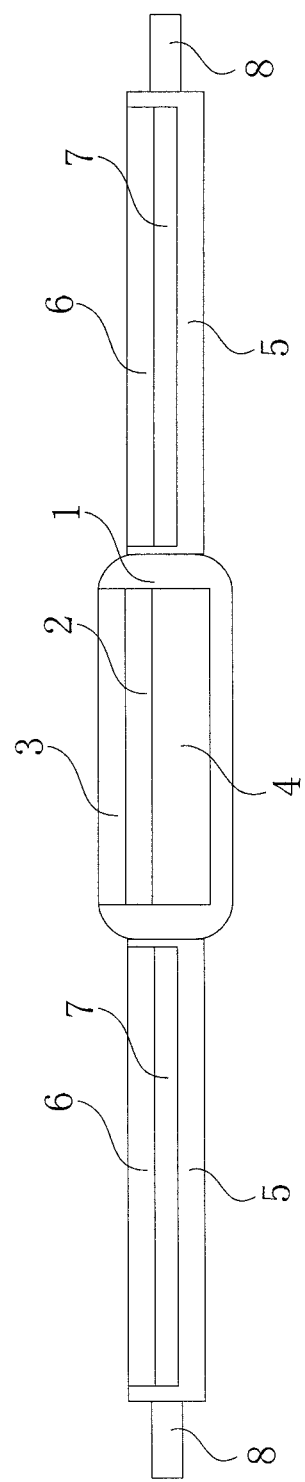
FIG. 5 is a sectional view of a solar smart watch of a second embodiment of the present disclosure.
Figure 6:
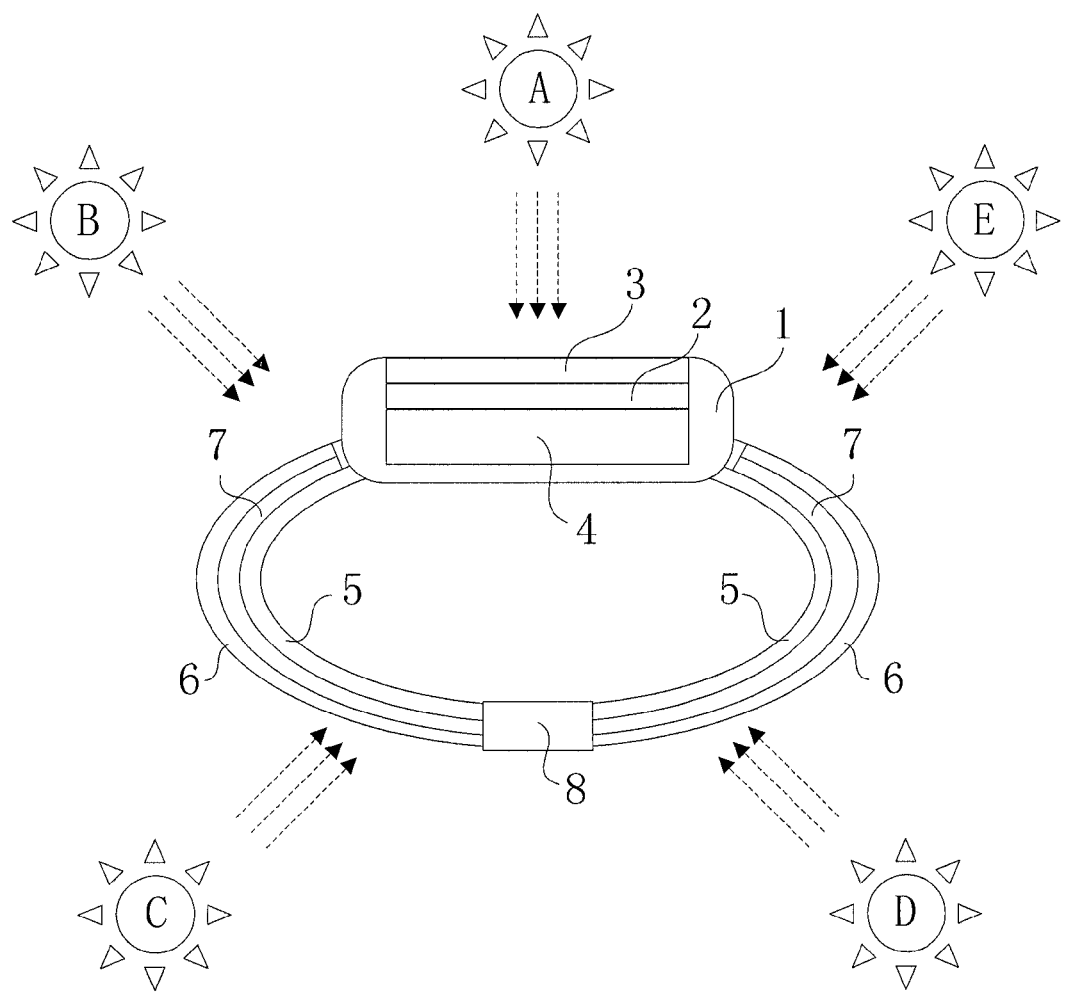
FIG. 6 is a schematic diagram of a wearing state of the solar smart watch of the second embodiment of the present disclosure.

As illustrated in FIGS. 5 and 6, the second embodiment of the present disclosure provides a solar smart watch including a case 1, a first display component, a battery 4, two bands 5, two second display components and a control module. The first display component is provided on the surface of the case 1, and the first display component includes a first touch sensing device (not illustrated), a first display device 2 and a first solar device 3. The first solar device 3 is provided on an upper surface of the first touch sensing device (not illustrated), or the first solar device 3 may also be provided between the first touch sensing device (not illustrated) and the first display device 2, but it is not limited thereby. The first touch sensing device may be a thin film type capacitor array. The two bands 5 are connected to the two ends of the case 1, respectively. Each band 5 includes a band body. The second display components are provided on an upper surface of the band body, respectively. A first end of the band body is connected to the case 1, and a second end thereof is connected to a buckle 8. The second display component includes a second display device 7 that is flexible and a second solar device 6 that is flexible. The second solar device 6 is laminated on an upper surface of the second display device 7, so as to improve sunlight absorption, but it is not limited thereby. The band body may be but not limited to a metal band, a leather band, a plastic (or rubber)

band, or the like. The control module is respectively connected to the first display device and the second display device, so as to collectively control the contents displayed on the two display devices. The battery 4 is provided in the case 1. The battery 4 is respectively connected to the first solar device 3 and the second solar device 6 in the band, and receives and stores electric power from the first solar device 3 and the second solar device 6.

The first display component and the second display component have different screen structures. The first display component is a primary display screen for displaying major information. The second display component is a secondary display screen mainly for displaying decorative colors or other secondary information. The first display component requires a relatively high transparency of a transmittance equal to or greater than 90%, but it is not limited thereto. The type of the display screen used in the first display component is a liquid display device (a hard screen) or an organic light emitting diode display device (a hard screen or a flexible screen).

Preferably, the second display device 7 may respectively include a second touch sensing device (not illustrated), and the second touch sensing device may be a thin film type capacitor array for performing touch control on the content displayed in the second display device 7. The second display device 7 is an organic light emitting diode display device (a flexible screen) freely bendable along with the band. The second display component has a transmittance of 40% to 80%, but it is not limited thereto. The second display component is required to occupy a relative large display area to have enough area usable for solar modules, and the second display component has an area equal to or greater than that of the first display component. Ideally, the second display component occupies an area equal to or greater than 60% of the total display area, but it is not limited thereto. Each second display component has a length equal to that of each band, but it is not limited thereto. A width of the second display device is equal to or greater than 80% of a width of the band, but it is not limited thereto.

As illustrated in FIG. 6, after the bands 5 of the solar smart watch are buckled up using the buckle 8, the solar smart watch forms a ring shape, while both the second display device 7 and the second solar device 6 on the bands 5 are able to bend into a ring structure along with the bands. The first solar device 3 and the second solar device 6 may absorb light from more directions (e.g., the sun at different orientations A, B, C, D and E of the watch), and thus ensure some part of the second solar device 6 always faces the strong light source, so as to obtain and generate more electric power. In addition, the second display device 7 having a large area may provide more information, create virtual buttons for the operation of the solar smart watch, or the like.

The second embodiment adds the first solar device 3 in the first display component, on the basis of the first embodiment, which further increases the area of the solar device. It may facilitate obtaining more light rays, thereby generating more electric power and increasing battery life of the watch.

The Third Embodiment

Figure 7:
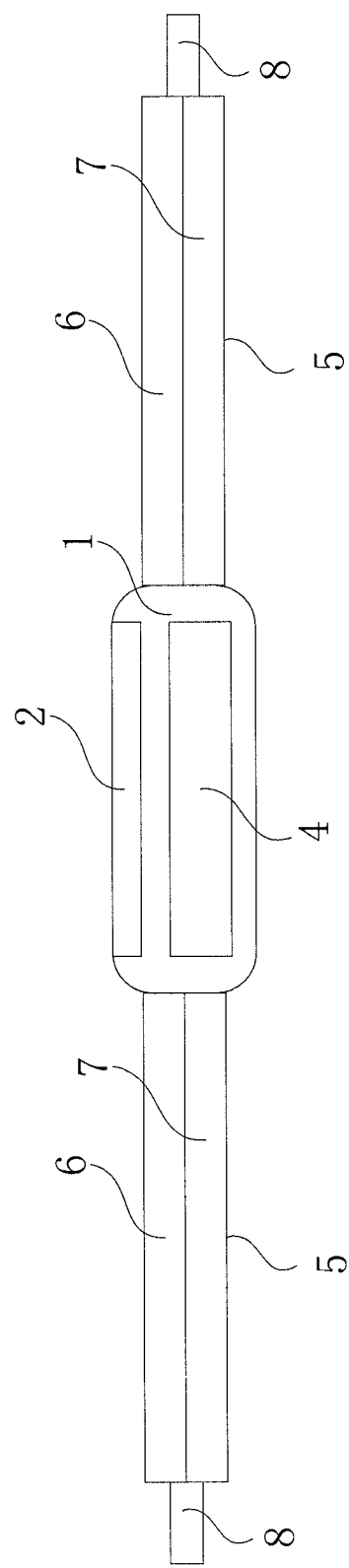
FIG. 7 is a sectional view of a solar smart watch of a third embodiment of the present disclosure.
Figure 8:
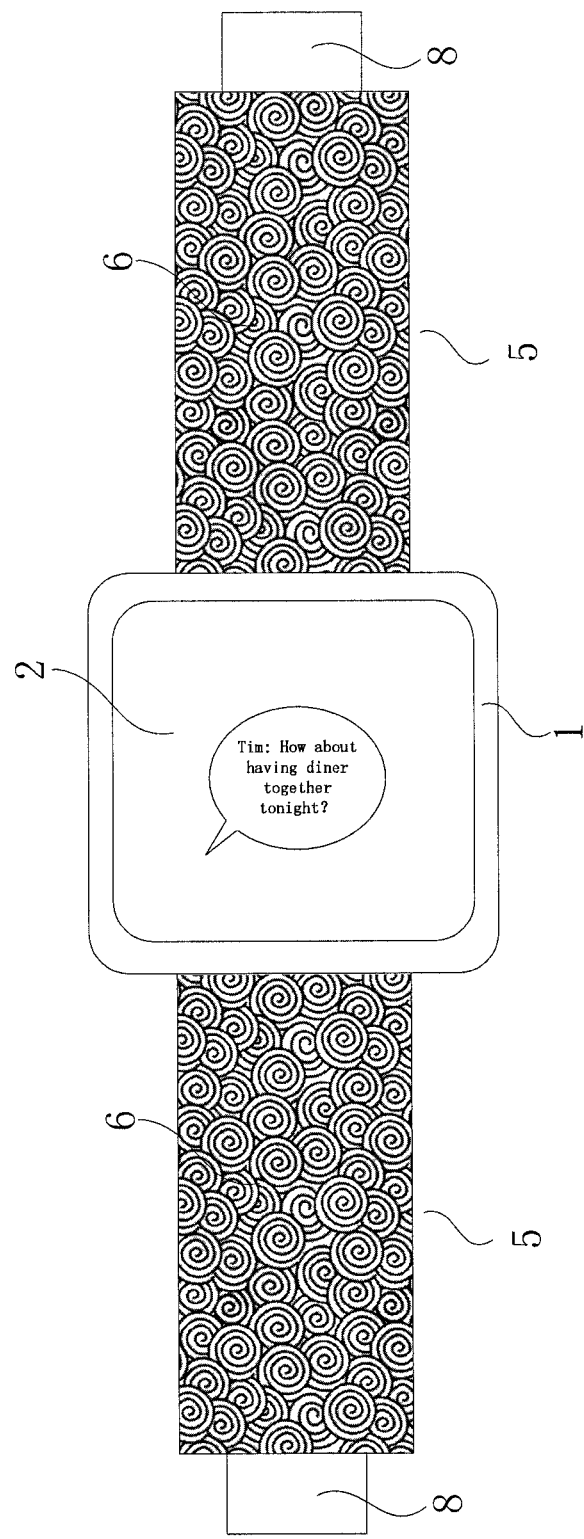
FIG. 8 is a plan view of the solar smart watch of the third embodiment of the present disclosure.
Figure 9:
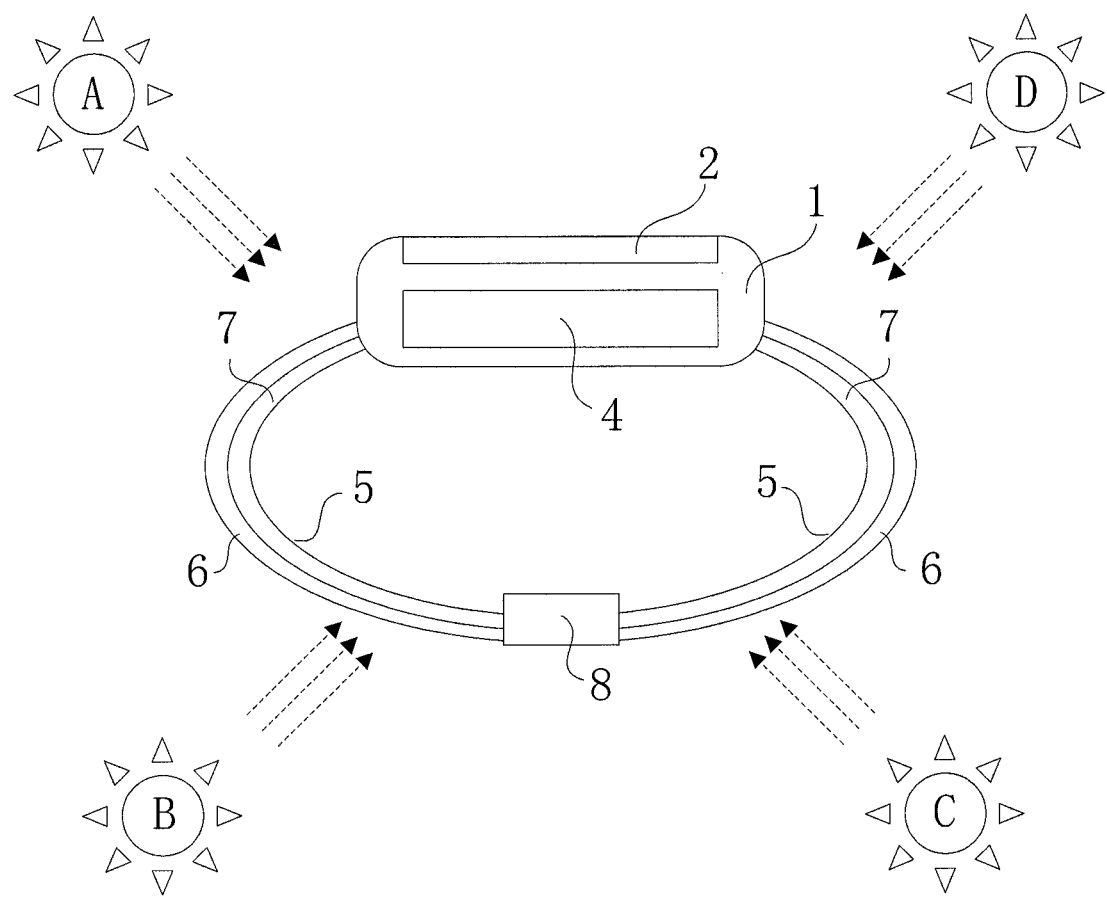
FIG. 9 is a schematic diagram of a wearing state of the solar smart watch of the third embodiment of the present disclosure.

As illustrated in FIGS. 7-9, the third embodiment of the present disclosure provides a solar smart watch including a case 1, a first display component, a battery 4, two bands 5 and a control module. The first display component is provided on a surface of the case 1, and the first display component includes a first touch sensing device (not illustrated) and a first display device 2. The first touch sensing device may be a thin film type capacitor array. The two bands 5 are connected to the two ends of the case 1, respectively. Each band 5 is completely formed of the second display device independently. A first end of the second display component is connected to the case 1, and a second end thereof is connected to a buckle 8. The second display component includes a second display device 7 that is flexible and a second solar device 6 that is flexible. The second solar device 6 is laminated on an upper surface of the second display device 7, so as to improve sunlight absorption, but it is not limited thereby. Each of the second display device 7 and the second solar device 6 includes a flexible substrate bendable like watch bands, and thus the second display component may be used as the band 5. Since the second display component has transparency, the wrist of the user may be seen through the second display component when the user is wearing the watch, thus the watch seems to be floating over the wrist. Compared with the first and second embodiments, the third embodiment has a novel visual effect. The control module is respectively connected to the first display device and the second display device, so as to collectively control the contents displayed on the two display devices. The battery 4 is provided in the case 1. The battery 4 is respectively connected to the second solar device 6 in the bands, and receives and stores electric power from the second solar device 6.

The first display component and the second display component have different screen structures. The first display component is a primary display screen for displaying major information (as illustrated in FIG. 8, displaying time or short message). The second display component is a secondary display screen mainly for displaying decorative colors and patterns (as illustrated in FIG. 8, displaying different decorative patterns and changing into different bands) or other secondary information. The first display component requires a relatively high transparency of a transmittance equal to or greater than 90%, but it is not limited thereto. The type of the display screen used in the first display component is a liquid display device (a hard screen) or an organic light emitting diode display device (a hard screen or a flexible screen).

Preferably, the second display device 7 may respectively include a second touch sensing device (not illustrated), and the second touch sensing device may be a thin film type capacitor array for performing touch control on the content displayed in the second display device 7. The second display device 7 is an organic light emitting diode display device (a flexible screen) freely bendable along with the band. The second display component has a transmittance of 40% to 80%, but it is not limited thereto.

As illustrated in FIG. 9, after the bands 5 of the solar smart watch are buckled up using the buckle 8, the solar smart watch forms a ring shape, while both the second display device 7 and the second solar device 6 on the bands 5 are able to bend into a ring structure along with the bands. The second solar device 6 may absorb light from various directions (e.g., the sun at different orientations A, B, C and D of the watch), and thus ensure some part of the second solar device 6 always faces the strong light source, so as to obtain and generate more electric power. In addition, the second display device 7 having the largest area may provide more information, create virtual buttons for the operation of the solar smart watch, or the like.

The second display component is required to occupy a relative large display area to have enough area usable for solar modules, while in the present embodiment, the second display component itself is the band, which no longer has any occupation of side frame, thereby maximizing the display area. Compared with the first and second embodiments, the third embodiment has a better solar charging effect, and a longer battery life.

The Fourth Embodiment

Figure 10:
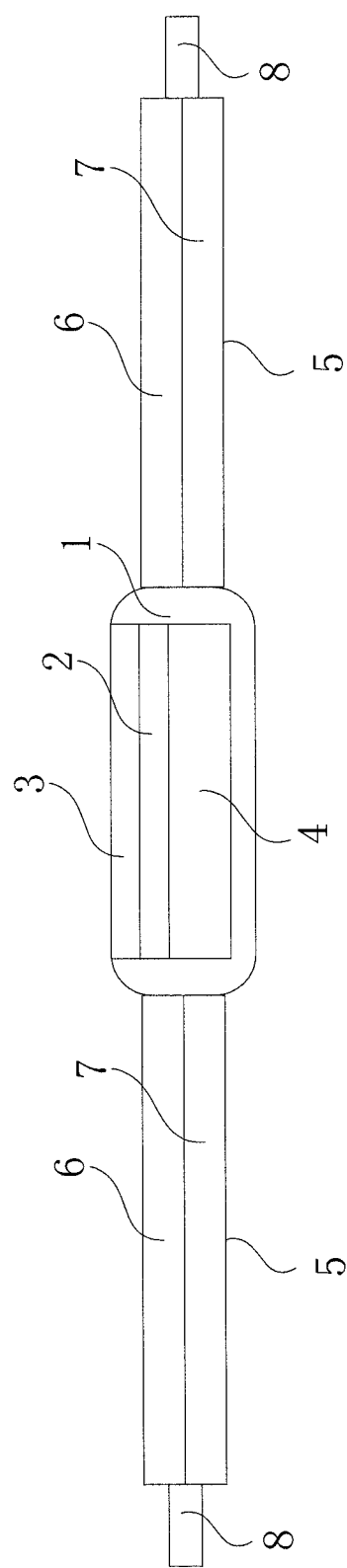
FIG. 10 is a sectional view of a solar smart watch of a fourth embodiment of the present disclosure.
Figure 11:
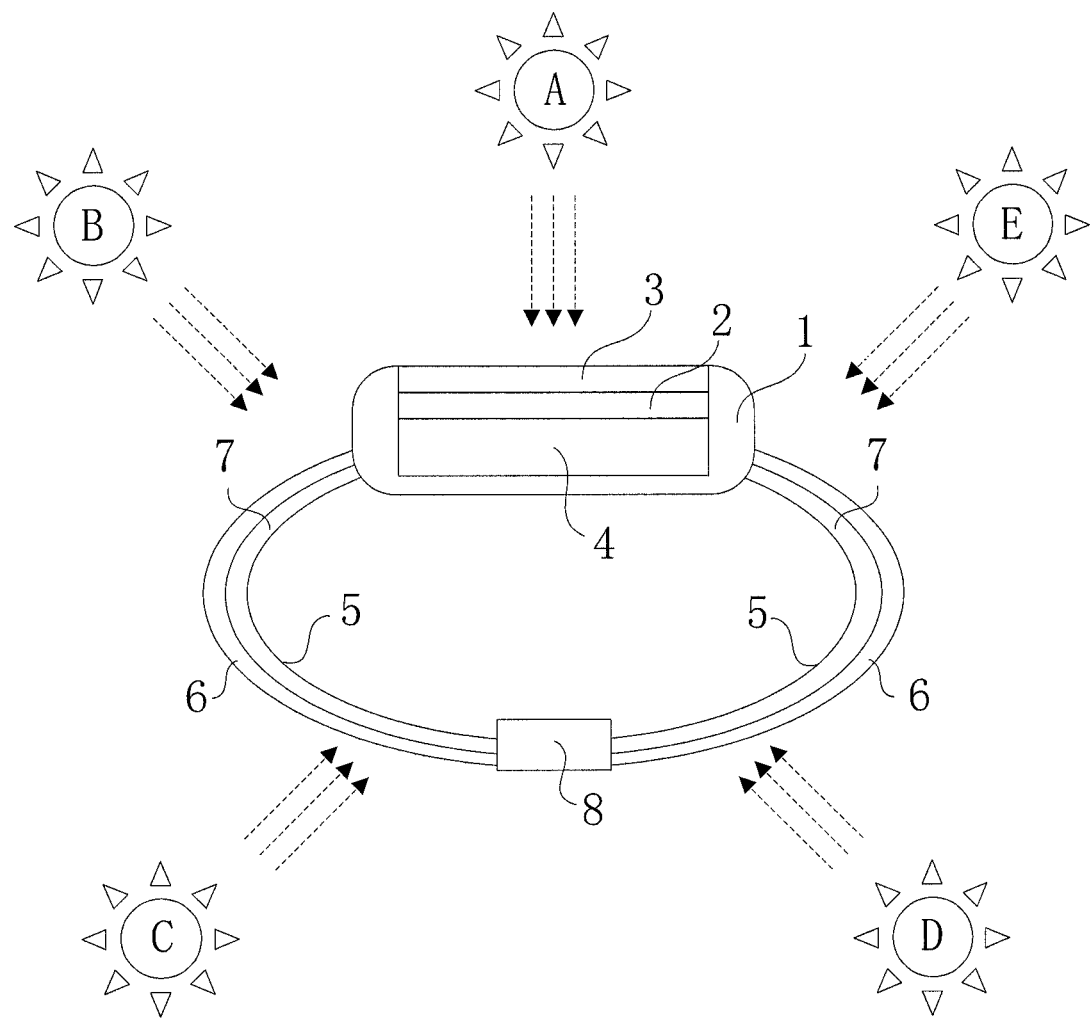
FIG. 11 is a schematic diagram of a wearing state of the solar smart watch of the fourth embodiment of the present disclosure.

As illustrated in FIGS. 10 and 11, the fourth embodiment of the present disclosure provides a solar smart watch. Compared with the third embodiment, the first display component of the fourth embodiment includes a first touch sensing device (not illustrated), a first display device 2 and a first solar device 3. The first solar device 3 is provided on an upper surface of the first touch sensing device (not illustrated), or the first solar device 3 may also be provided between the first touch sensing device (not illustrated) and the first display device 2, but it is not limited thereto. The battery 4 is provided in the case 1. The battery 4 is respectively connected to the first solar device 3 and the second solar device 6 in the band, and receives and stores electric power from the first solar device 3 and the second solar device 6. Other features are the same as those of the third embodiment, and they are not repeated herein.

As illustrated in FIG. 11, after the bands 5 of the solar smart watch are buckled up using the buckle 8, the solar smart watch forms a ring shape, while both the second display device 7 and the second solar device 6 on the bands 5 are able to bend into a ring structure along with the bands. The first solar device 3 and the second solar device 6 may absorb light from more directions (e.g., the sun at different orientations A, B, C, D and E of the watch), and thus ensure some part of the second solar device 6 always faces the strong light source, thereby obtaining and generating more electric power.

The fourth embodiment adds the first solar device 3 in the first display component, on the basis of the third embodiment, which further increases the area of the solar device. It may facilitate obtaining more light rays, thereby generating more electric power and increasing battery life of the watch.

Specific embodiments of the present disclosures have been described above. It should be understood that the present disclosure is not limited to the above particular implementations, and those skilled in the art may make various changes or modifications within the scope of the claims, all without affecting the substantive content of the present disclosure.

What is claimed is:

1. A smart watch, comprising:
   a case;
   a first display component, provided on a surface of the case, the first display component comprising at least a first touch sensing device and a first display device;
   two bands, respectively connected to opposite ends of the case, each of the two bands comprising a second display component, the second display component comprising at least a second display device that is flexible and a second solar device that is flexible, and the second solar device being laminated on an upper surface of the second display device; and
   a control module, connected to the first display device and the second display device.

2. The smart watch according to claim 1, wherein each of the two bands is independently formed of the second display component, a first end of the second display component is connected to the case, and a second end of the second display component is connected to a buckle.

3. The smart watch according to claim 2, wherein the first display component further comprises a first solar device, and the first solar device is selectively provided on an upper surface of the first touch sensing device or between the first touch sensing device and the first display device.

4. The smart watch according to claim 3, further comprising a battery, provided in the case, the battery being respectively connected to the first solar device and the second solar device of each of the bands.

5. The smart watch according to claim 1, wherein each of the two bands further comprises a band body, the second display component is provided on an upper surface of the band body, a first end of the band body is connected to the case, and a second end of the band body is connected to a buckle.

6. The smart watch according to claim 5, wherein the first display component further comprises a first solar device, and the first solar device is selectively provided on an upper surface of the first touch sensing device or between the first touch sensing device and the first display device.

7. The smart watch according to claim 6, further comprising a battery, provided in the case, the battery being respectively connected to the first solar device and the second solar device of each of the bands.

8. The smart watch according to claim 1, wherein the first display component further comprises a first solar device, and the first solar device is selectively provided on an upper surface of the first touch sensing device or between the first touch sensing device and the first display device.

9. The smart watch according to claim 8, further comprising a battery, provided in the case, the battery being respectively connected to the first solar device and the second solar device of each of the bands.

10. The smart watch according to claim 1, wherein the second display device further comprises a second touch sensing device.

11. The smart watch according to claim 1, wherein the first display component has a light transmittance equal to or greater than 90%.

12. The smart watch according to claim 11, wherein the second display component has a light transmittance of 40% to 80%.

13. The smart watch according to claim 1, wherein the second display component has a light transmittance of 40% to 80%.

14. The smart watch according to claim 1, wherein the second display component has a width equal to or greater than 80% of the width of the band.

15. The smart watch according to claim 1, wherein the second display component has an area equal to or greater than that of the first display component.

16. The smart watch according to claim 15, wherein the second display component has an area equal to or greater than 60% of the total display area.

17. The smart watch according to claim 1, wherein the first display device is a liquid crystal device or an organic light emitting diode display device.

18. The smart watch according to claim 17, wherein the second display device is an organic light emitting diode display device.

19. The smart watch according to claim 1, wherein the second solar device has a light transmittance of 40% to 80%.

20. The smart watch according to claim 1, further comprising a battery, provided in the case, the battery being connected to the second solar device of each of the bands.

* * * * *